(12) United States Patent
Arche et al.

(10) Patent No.: US 7,656,385 B2
(45) Date of Patent: Feb. 2, 2010

(54) SLIP RESISTANT AND/OR NON-LINEAR FORCE RESPONSE PEDAL PERIPHERAL DEVICE

(75) Inventors: Glenn Steven Arche, Bothell, WA (US);
Loren Douglas Reas, Kent, WA (US);
John K. Ikeda, Seattle, WA (US);
Daniel J. Blasé, Everett, WA (US);
Joshua David Maruska, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 614 days.

(21) Appl. No.: 11/413,862

(22) Filed: Apr. 28, 2006

(65) Prior Publication Data

US 2007/0252811 A1    Nov. 1, 2007

(51) Int. Cl.
*G09G 5/00* (2006.01)
(52) U.S. Cl. ................................ 345/156; 345/184
(58) Field of Classification Search ................. 345/156, 345/184
See application file for complete search history.

(56) References Cited

U.S. PATENT DOCUMENTS

| | | | | |
|---|---|---|---|---|
| 4,206,636 | A | 6/1980 | Hendrix | 73/132 |
| 5,148,152 | A * | 9/1992 | Stueckle et al. | 345/156 |
| 5,552,807 | A | 9/1996 | Hayes et al. | 345/156 |
| 6,083,106 | A | 7/2000 | McDowell | 463/46 |
| 6,113,121 | A | 9/2000 | Mizuta | 280/163 |
| 6,132,313 | A | 10/2000 | Yamaguchi | 463/36 |
| 6,312,039 | B1 | 11/2001 | Bartz | 296/75 |
| 2003/0037632 | A1 | 2/2003 | Cho | 74/512 |
| 2004/0009814 | A1 | 1/2004 | Kim | 463/36 |
| 2004/0147317 | A1 | 7/2004 | Ito et al. | 463/36 |
| 2005/0156878 | A1 * | 7/2005 | Logue | 345/156 |
| 2006/0003839 | A1 | 1/2006 | Lawrence et al. | 463/36 |

FOREIGN PATENT DOCUMENTS

WO    WO 00/03621  A1    1/2000

OTHER PUBLICATIONS

Saitek, (Saitek_R440_Manual.pdf), Apr. 20, 2004.*
"LP LP388 Gajant foot pedal bracket percussion mounts," *Music123*, http://www.music123.com/Lp-LP388-Gajate-Foot-Pedal-Bracket-i31598.music, downloaded from the Internet on Apr. 11, 2006, 3 pages.
"Pedal sets," *Hill Engineering*, http://www.hill-engineering.co.uk/homemainferrari.htm, downloaded from the Interned on Apr. 11, 2006, 8 pages.
"Yamaha FC4 piano-style sustain pedal," *zZounds*, http://www.zzounds.com/itm--YAMFC4, downloaded from the Internet on Apr. 11, 2006.

* cited by examiner

*Primary Examiner*—Amare Mengistu
*Assistant Examiner*—Dmitriy Bolotin
(74) *Attorney, Agent, or Firm*—Woodcock Washburn LLP

(57) ABSTRACT

Peripheral devices having one or more pedals are provided, wherein the peripheral devices are slip resistant with respect to a surface, such as a floor, upon which the peripheral devices are placed or positioned. A user of such peripheral devices can use a heel against the floor surface through the peripheral device to anchor the peripheral device and can use the heel to correct the position of the peripheral device if it slips by applying a counterforce. The peripheral device(s) include multiple springs per pedal and associated software for accommodating a non-linear force response for a more realistic user experience.

10 Claims, 14 Drawing Sheets

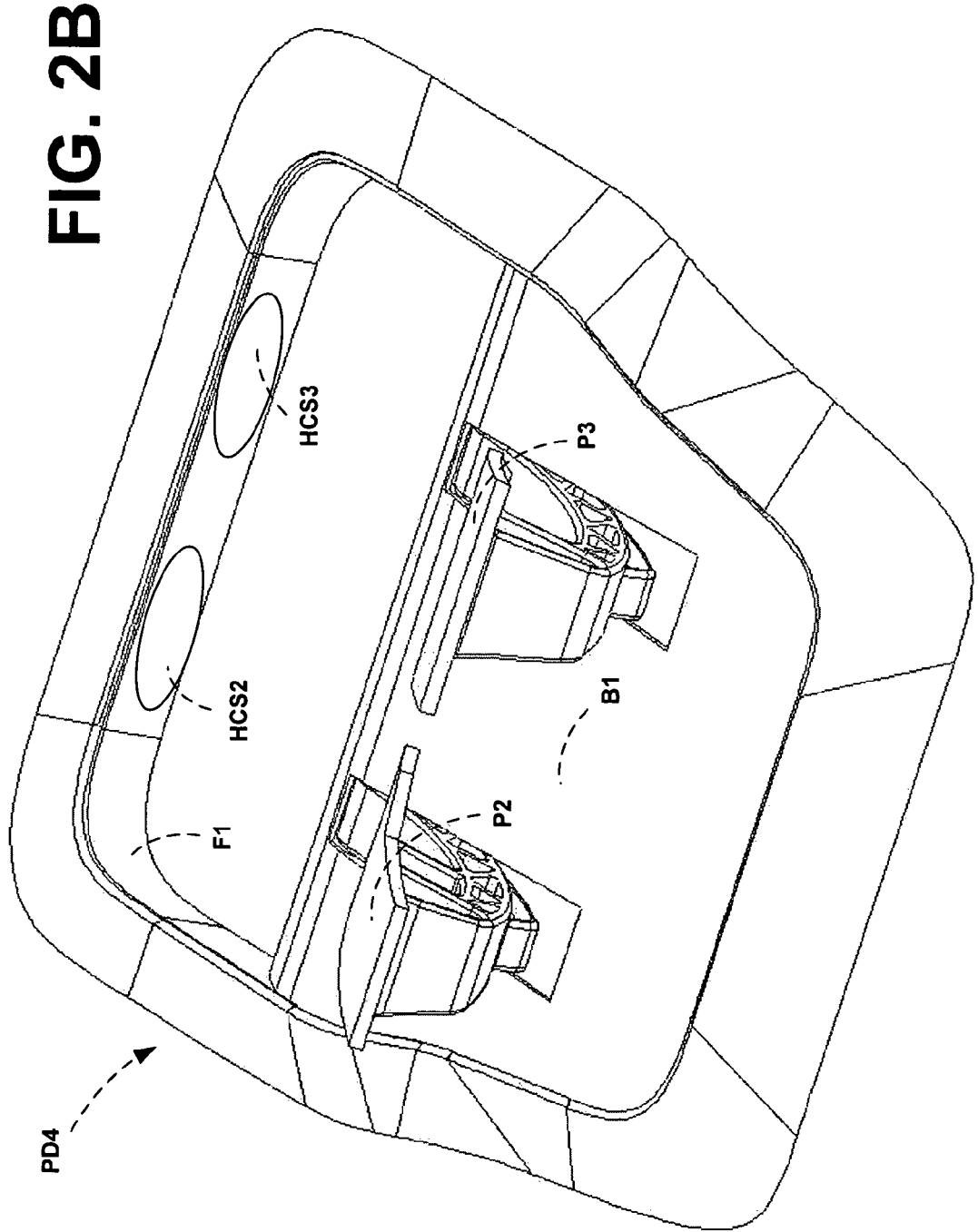

US 7,656,385 B2

SLIP RESISTANT AND/OR NON-LINEAR FORCE RESPONSE PEDAL PERIPHERAL DEVICE

FIELD OF THE INVENTION

The present invention relates to peripheral device(s) having one or more pedals, wherein the peripheral device(s) are slip resistant with respect to a surface, such as a floor, upon which the peripheral device(s) are placed or positioned and where the peripheral device(s) include at least one spring per pedal and associated software for accommodating a non-linear force response for a more realistic user experience.

BACKGROUND OF THE INVENTION

Peripheral devices, such as steering wheel assemblies, sometimes include a peripheral component that has one or more pedals, which are typically operated by a user's foot or feet while the user of the peripheral device is sitting, standing, or otherwise in a position to make contact with the pedal(s) of the peripheral device. As an example of such a peripheral device, some gaming steering wheel peripherals have included a pedal assembly to simulate accelerator, brake, and sometimes clutch pedals of automobiles. However, a recurring and persistent problem with these pedal assemblies is that the peripheral component including the pedal(s) tend to slide or slip on a wide variety of floor surfaces (tile, hardwood, carpet, etc). Some attempts have been made to mitigate this issue, but such attempts appear to be, at best, afterthoughts of the overall design.

For instance, rubber feet have been placed on the bottom of a pedal assembly in order to take advantage of the greater coefficient of friction with respect to certain floor surfaces relative to the material (e.g., plastic) comprising the housing of the pedal assembly. However, rubber feet suffer from the problem that they do not work well on carpeted surfaces, and even for many hard surfaces, they function sub-optimally as well, particularly where dust and the like is likely to accumulate and interfere with the rubber foot to floor contact. Even where rubber feet are attached to a bottom surface of a pedal assembly, the problem is that oftentimes the horizontal component of the force exerted by the user's foot on the pedal assembly's base and/or pedal surfaces becomes greater than the frictional force between the pedal base's rubber feet and the floor/carpeted surface, and the pedal assembly slides away from the user as a result, impacting the user experience significantly.

"Carpet grabbing" barbs or hooks have also been applied to the undersurface of a pedal assembly in order to help mitigate slipping of the pedal assembly on carpeted surfaces. In this regard, carpet grabbing barbs or hooks are intended to work with carpeted surfaces, where the barbs or hooks can engage, or mechanically couple, with the carpet material. However, it has been shown that such barbs or hooks can cause damage to the underlying carpet material in just a short amount of time. Also, carpet grabbing barbs do not work on hard or sheer surfaces where there is no structure into or onto which the grabbing features can hook. Furthermore, some implementations of carpet grabbing barbs or hooks can damage certain hard surfaces (e.g., relatively soft hardwood floors) due to the protruding nature of the hook features.

Facing frustration from not having an integrated feature that solves the sliding and slipping problem, many end-users have devised their own external methods, such as placing a very heavy object (e.g., a cinder block) in front of the pedal assembly, anchoring the pedal assembly in front of a piece of wood against a wall to prevent it from sliding, or securing the pedal assembly to a chair upon which the user sits via a piece of wood or the like that is secured to the chair at one end and to the pedal assembly at the other end. Some users have even resorted to nailing a piece of wood into the floor to prevent slipping of the pedal assembly on the floor surface. Apart from the lack of sophistication of such kluges, such solutions inherently tend to cause damage to the floor, or chair, or even the pedal assembly itself. Accordingly, there is a need in the art of peripheral devices including at least one pedal for an anti-slip mechanism that applies generally to all types of floor surfaces, does not inherently cause damage to floor surfaces (or chairs, or the peripheral device itself), and that is integrated with the pedal assembly from a design standpoint.

Moreover, the pedals for a pedal assembly of a peripheral device, such as a steering wheel peripheral package, are currently constructed with a single spring design in which the force to actuate compression of the spring caused by a user's foot on the pedal is linear with respect to the angle/distance traveled according to the spring constant defined for the spring. However, due to limited effect of such linearity, such single spring designs often do not match the desired user experience for the pedal assembly.

For instance, the feel of a gas pedal, clutch, or brake pedal in a car may lose its sense of realism in game play due to the simple linear haptic feel afforded movement of the pedal. For an example of such loss of realism, a brake pedal in most modem automobiles goes from a light breaking to hard breaking as the pedal is engaged further in a nonlinear fashion. Clearly, such haptic feel of a car brake pedal cannot be duplicated via the single spring model of existing designs. Accordingly, non-linear and/or multiple effects, i.e., changes in force requirements to move a pedal, are desired with respect to the motion of a pedal of a pedal assembly.

Solutions to these and other deficiencies of the state of the art of anti-slipping mechanisms for peripheral devices having at least one pedal are thus desirable.

SUMMARY OF THE INVENTION

In view of the foregoing, the present invention provides a peripheral device, such as a pedal assembly, having at least one pedal, wherein the peripheral device includes at least one structure that enables a user's heel of the user's foot to provide a counterforce to a slipping force when the user operates the at least one pedal, wherein the counterforce prevents the slipping force from causing the peripheral device to slide across the surface upon which a bottom surface of the peripheral device rests.

In one non-limiting embodiment, one or more structures are provided with the housing of the peripheral device that allow the user's heel to make contact with a floor surface under the peripheral device, such that the user's heel abuts a contact surface of the housing of the peripheral device, whereby the peripheral device is prevented from slipping because the user's heel is anchored against the floor, thereby providing the counterforce against the slipping force.

In another non-limiting embodiment, one or more structures allow a user to move the user's foot directly against the contact surface of the housing, thereby directly applying the counterforce against the contact surface. Should the peripheral device nonetheless slip, the invention thus optionally allows a user to correct the position of the peripheral device by engaging the contact surface of the housing to cause the peripheral device to correctively slip in the opposite direction by exceeding the slipping force with the counterforce. A heel engaging mechanism may optionally be provided with the housing of the peripheral device to couple the peripheral device to the user's heel, shoe, ankle, etc. to help guide the counterforce applied by the user's foot when used to counter the slipping force.

In other non-limiting embodiments, the invention provides a peripheral device, such as a pedal assembly, joystick, or the like, that includes at least one spring for one or more axes of motion. The at least one spring provides a non-linear force response characteristic that can be mapped to non-linear real world responses for a more realistic user experience. Software and associated APIs are optionally provided to translate, or inverse map, the non-linear force signal to a linear force signal understood by existing peripheral communication structures.

Other features of the present invention are described below.

BRIEF DESCRIPTION OF THE DRAWINGS

The anti-slip and non-linear force response spring mechanisms and methods of the invention are further described with reference to the accompanying drawings in which:

FIGS. 2A and 2B illustrate an exemplary, non-limiting implementation of an anti-slip peripheral device having at least one pedal in accordance with the invention;

DETAILED DESCRIPTION OF ILLUSTRATIVE EMBODIMENTS

As mentioned in the background, current anti-slip mechanisms for peripheral devices including pedals do not apply to all types of floor surfaces, cause damage to floor surfaces (or chairs, or the peripheral device itself), and are not integrated with the housing of the peripheral device from a design standpoint. Moreover, the single spring design implemented for current pedal assemblies are limited to linear spring compression curves as defined by the single spring constant, and accordingly, such single spring designs often do not match the desired user experience for the peripheral devices to the realities they are intended to simulate.

Accordingly, in various non-limiting embodiments, the present invention provides a peripheral device, such as a pedal assembly, having at least one pedal, wherein the peripheral device includes at least one structure that enables a user's heel of the user's foot to provide a counterforce to a slipping force when the user operates the at least one pedal, wherein the counterforce prevents the slipping force from causing the peripheral device to slide across the surface upon which a bottom surface of the peripheral device rests.

Figure 1A:
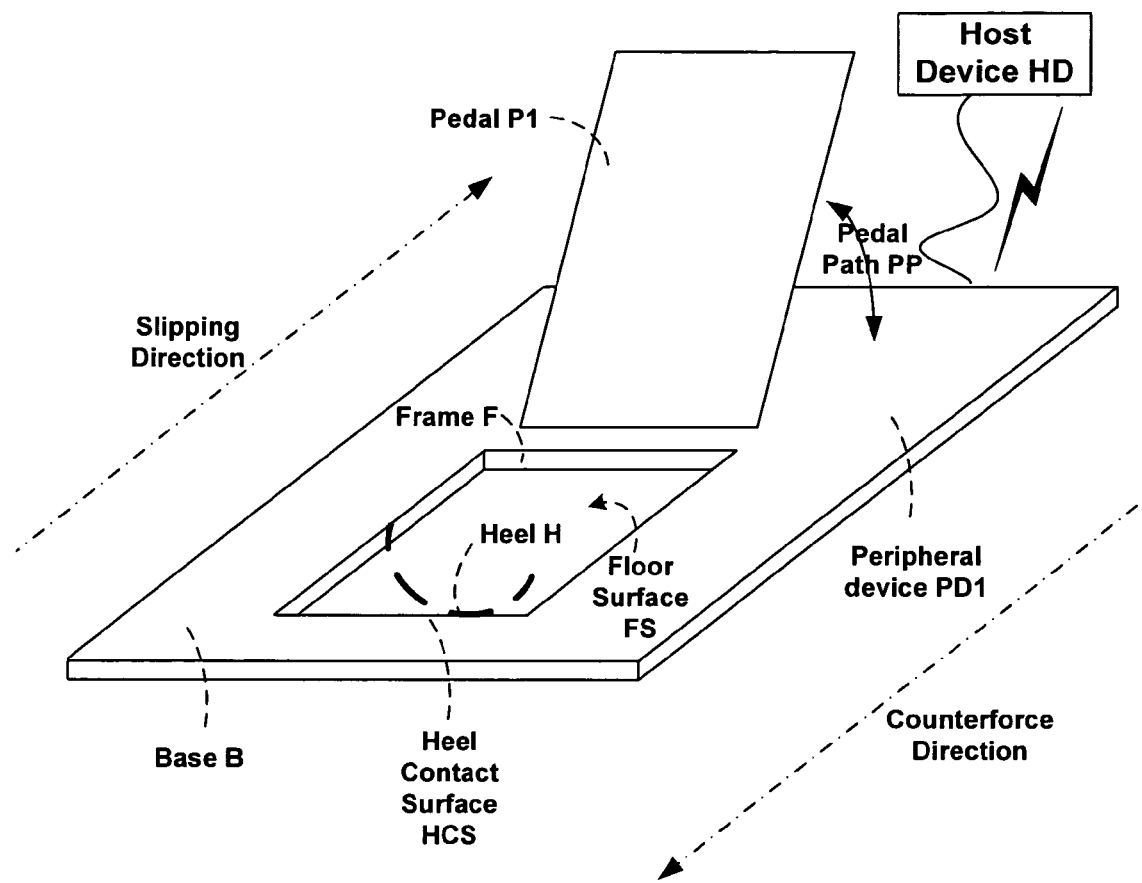
FIGS. 1A, 1B and 1C illustrate various non-limiting embodiments of a peripheral device including at least one pedal that includes an anti-slipping mechanism in accordance with the invention.

As illustrated in FIG. 1A, a first embodiment of a peripheral device PD1 in accordance with the invention includes at least one pedal, such as pedal P1. As can be appreciated, when a user of the peripheral device PD1 operates the pedal P1, usually with the user's foot or shoe (though it is also possible with other implements such as the user's hand, a stick, or the like), pedal P1 moves generally along pedal path PP to form more or less of an angle with respect to a surface, such as an upper surface, of based B of the peripheral device PD1. Movement of the pedal P1 and underlying mechanism (not shown) responsive to the force applied is translated to signals or data reflective of the motion of the pedal P1 and then the signals or data are transmitted wirelessly or via wired means to a host device HD, which may itself be another peripheral device, or any other computing device capable of supporting the peripheral device PD1.

As further shown in FIG. 1A, the floor surface FS (e.g., hard floor, soft floor, carpet, etc.) under the peripheral device PD1 is exposed through the introduction of frame F in base B which exposes the floor surface FS through one or more holes created by frame F. While frame F is shown in exemplary fashion as a rectangular hole through base B of peripheral device PD1, any shape generally suited to receiving a user's foot, or shoe, or heel of a foot or shoe, may be implemented, whether regular, or irregular. Furthermore, while frame F is depicted as having orthogonal angles to the base B of peripheral device PD1, frame F may take any particular angles, as long as the floor surface FS is exposed through frame F.

To anchor the heel H of a user's foot or shoe (not shown) to the floor surface FS while operating pedal P1, and to keep the peripheral device PD1 from slipping in the slipping direction (see dotted line), frame F includes a heel contact surface HCS for receiving and abutting against heel H of the user's foot or shoe, thereby preventing the peripheral device PD1 from slipping in the slipping direction when the user presses down on pedal P1 due to the counterforce created generally in the counterforce direction (see dotted line).

In addition, should the peripheral device PD1 slip in the slipping direction nonetheless, e.g., if heel H slides along the floor surface FS along with peripheral device PD1 due to a great slipping force in the slipping direction generated by operation of the pedal P1, the user may optionally move his or her heel H generally in the counterforce direction with sufficient counterforce to return the peripheral device PD1 to its position prior to slipping. This empowers the user of the peripheral device PD1 to make slip adjustments to the position of the peripheral device PD1 to keep the peripheral device PD1 generally in one place.

Accordingly a hole, such as formed by frame F, is provided in the housing of the peripheral device PD1 that allows the user's heel H to make contact with a floor surface FS under the peripheral device PD1, such that the user's heel H abuts a contact surface HCS of the base B of the housing of the peripheral device PD1, whereby the peripheral device PD1 is prevented from slipping because the user's heel H is anchored against the floor surface FS, thereby providing the counterforce against the slipping force.

The hole formed by frame F also allows a user to move the user's heel H of the foot or shoe directly against the contact surface HCS of the housing, thereby directly applying a counterforce against the contact surface HCS. Should the peripheral device nonetheless slip, the invention thus optionally allows a user to correct the position of the peripheral device PD1 by engaging the contact surface HCS of the housing to cause the peripheral device PD1 to correctively slip in the opposite direction by exceeding the slipping force with the counterforce.

Figure 1B:
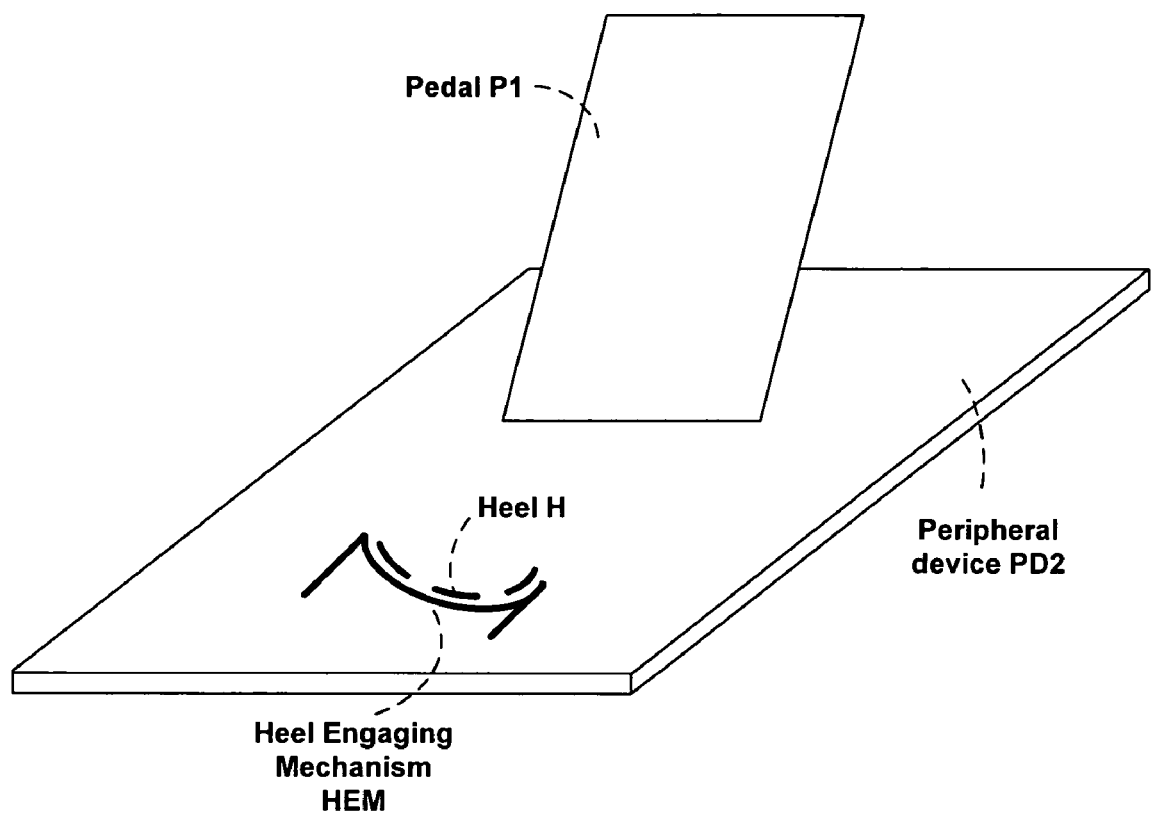

As shown in the exemplary non-limiting embodiment of FIG. 1B, a heel engaging mechanism HEM may optionally be provided with the housing of a peripheral device PD2 to couple the peripheral device PD2 by direct (clasp, clip, etc.) or indirect (e.g., via intermediate attachments) means to the user's heel, shoe, ankle, etc. to help guide and keep consistent the counterforce applied by the user's heel H when used to counter the slipping force. Heel engaging mechanism HEM may be adjustable to different size heels, shoes, boots, etc. Heel engaging mechanism HEM may be any known means of securing the user's foot or heel to the peripheral device PD2 including, but not limited to, straps, clips, clasps, buttons, snaps, boot, or the like, i.e., any retention mechanism known to those in the mechanical arts for retaining the heel H to the housing of the peripheral device PD2 via mechanical coupling. While the embodiment of FIG. 1B does not provide the benefit of anchoring heel H on floor surface FS, as with FIG. 1A, the embodiment of FIG. 1B still provides the advantage that the peripheral device PD2 can be returned to any position by overcoming any slipping force with an intentional counterforce created by the user of the peripheral device PD2.

Figure 1C:
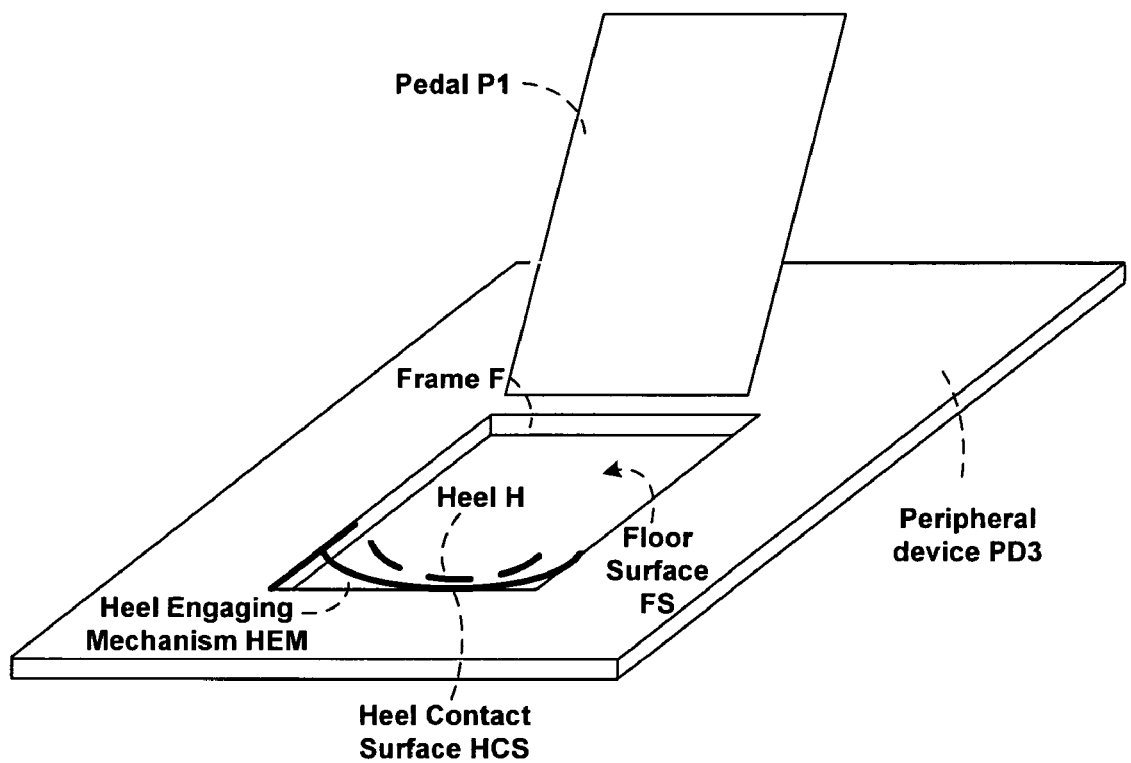

FIG. 1C illustrates still another exemplary, non-limiting embodiment of the invention. FIG. 1C illustrates that any one or more of the heel engaging mechanisms HEM of FIG. 1B may also be implemented in an embodiment including frame F and heel contact surface HCS of FIG. 1A. In this manner, a user's foot enjoys the benefits of guiding the motion of a user's foot against heel contact surface HCS via heel engaging mechanism HEM and also the benefits from anchoring the user's heel H to the floor surface FS through the hole formed by frame H of the housing of the peripheral device PD3. In any of the embodiments of the invention, heel engaging mechanism HEM may include adjustable means for tightening or loosening a degree of mechanical coupling to the user's heel H.

Figure 2A:
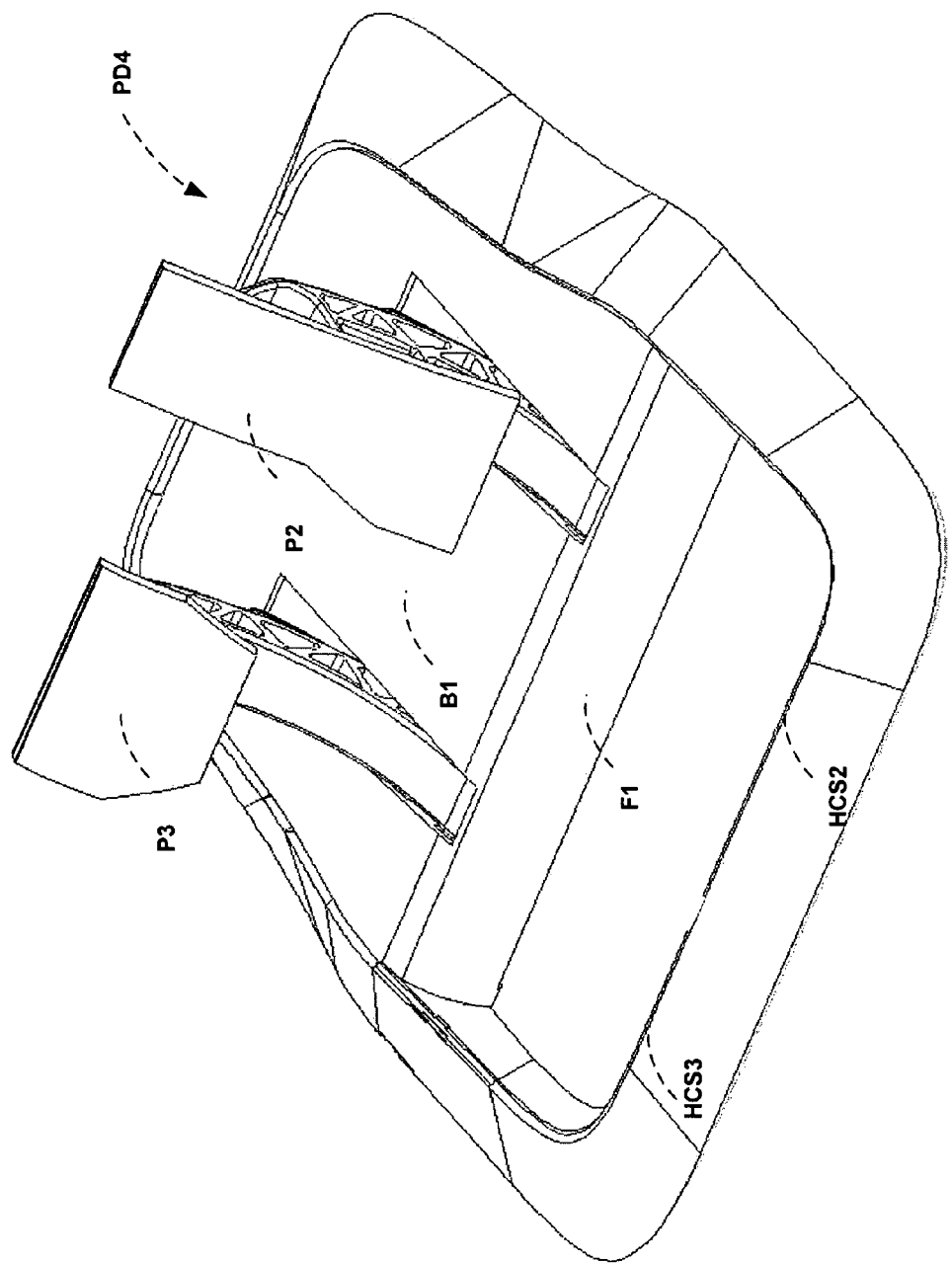

FIGS. 2A and 2B illustrate an exemplary non-limiting implementation of the invention in which a peripheral device PD4 includes two pedals P2 and P3, such as, but not limited to, a gas pedal and a brake pedal for an automobile application, such as a driving game or testing program. As can be appreciated from the structure shown in the perspective view of FIG. 2A, when the user's foot or feet are in position to use the pedals P2 and/or P3, the user's front(s) of the foot or feet, i.e., near the end of the foot where the toes are, are typically positioned on or just above the pedal areas P2 and/or P3. For the avoidance of doubt, when multiple pedals are present, a user may use one or two feet to utilize the multiple pedals. At the same time, the user's back area(s) of the foot, feet, or shoe(s), e.g., heel(s) are against surfaces HCS2 and/or HCS3, respectively, of frame F1 which forms a hole through base B1 of peripheral device PD4.

FIG. 2B illustrates the same implementation of FIG. 2A from a different perspective view. FIG. 2B shows that surfaces or regions HCS2 and HCS3 of this exemplary embodiment are considered to be the area where a user's heel of a foot or shoe would generally contact frame F1 when operating the pedals P2 and/or P3, respectively.

Figure 3:
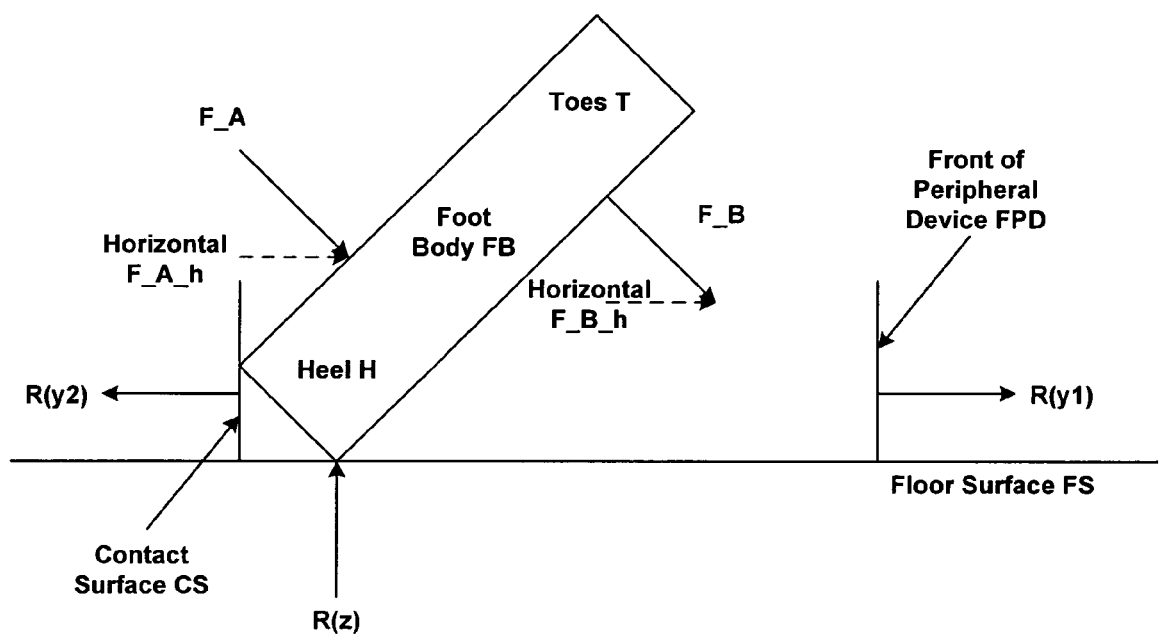
FIG. 3 illustrates an exemplary block diagram showing forces of interaction for an anti-slip peripheral device provided in accordance with the invention.

FIG. 3 depicts a mechanical schematic of the scenario showing the behaviors of simplified physical forces at work in accordance with the structures of the present invention. For instance, where:

F_A=the gravitational weight of the user's leg plus any force the user is exerting towards the foot with leg muscles;

F_A_h=the horizontal component of F_A parallel to the floor surface FS;

F_B=the force exerted by the user from his or her toe areas T onto a pedal surface;

F_B_h=the horizontal component of F_B parallel to the floor surface FS;

R(y1)=the force the front of the peripheral device FPD experiences in the horizontal direction from the horizontal components F_A_h and F_B_h of F_A and F_B, respectively;

R(y2)=the force in the horizontal direction that the heel H of a user exerts against contact surface CS.

R(z)=the resultant force in the Z direction (vertical) the floor exerts back onto the user's heel from the combination of F_A and the moment created by F_B.

For a pedal assembly of a peripheral device, the structures of the invention, e.g., contact surface CS, therefore enable R(y2) to exist. The addition of contact surface CS causes the reactionary force R(y2) in the direction towards the user that balances R(y1). Without R(y2), when the horizontal components of F_A and F_B become greater than the frictional force between the pedal assembly and the floor surface FS, causing the pedal assembly to slide away from the user.

However, with the force R(y2) created in accordance with the invention by integrating contact surface CS and exposing the user's heel H to the floor surface FS, if the user feels the pedal assembly sliding away from him, the user can then increase the horizontal component of F_A with his or her legs, causing R(y2) to increase to be substantially equal to R(y1) at the user's option. In such case, the pedal assembly will cease to slide forward.

In a case where the user does not adjust the horizontal component of F_A when the pedal assembly begins to slide forward and the pedal assembly actually slides forward to such a position that is not preferred by the user, at any time, the user can increase the horizontal component in F_A with his legs such that R(y2) is greater than R(y1). This causes the pedal assembly to slide back in the horizontal direction towards the user (in the direction of R(y2). Then, when the pedal assembly is in a position that the user prefers, the user can decrease the horizontal component of F_A until R(y2) again substantially equals R(y1) and the pedal assembly is again in equilibrium and stops sliding. Advantageously, the user can perform any of these actions without discontinuing or pausing use of the peripheral device thereby avoiding the need to have to re-adjust the pedal assembly's position by hand.

Figure 4A:
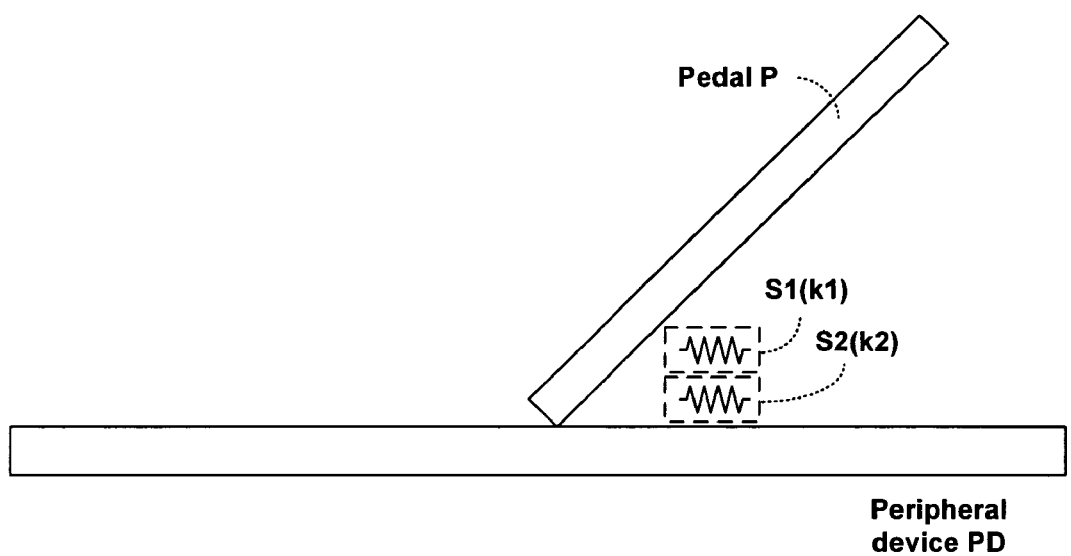
FIGS. 4A, 4D and 4E illustrate embodiments of a peripheral device in accordance with the invention including multiple springs for an axis of motion, thereby providing a non-linear force response with respect to that axis of motion in accordance with the invention.

As mentioned, in another aspect of a pedal assembly in order to provide a more realistic braking feel, a 2 stage spring design can be incorporated in accordance with embodiments of a peripheral device of the invention. As shown in FIG. 4A, for any pedal P, two springs S1 and S2 having spring constants k1 and k2, respectively, can be mechanically coupled between pedal P and one or more areas of peripheral device PD to provide a non-linear response to force applied to Pedal P, and a corresponding non-linear response as the Pedal P is released.

In one non-limiting embodiment, the first spring S1 is engaged with the pedal P and assembled with a preload whereas the second spring S2 is assembled in a non-compressed state and engaged after the pedal P, such as a brake pedal for a driving peripheral device for an automobile application, has traveled some predefined distance. For instance, when pressing on a brake pedal, there is an initial force greater than zero required to achieve initial movement, represented by a preload on S1, which is approximately 1 pound in an exemplary, non-limiting implementation. For instance, in one exemplary, non-limiting embodiment, the pre-defined distance defined in accordance with about 50% of the total travel performed when pressing the pedal P completely from "resting" point to "pedal to the metal" point. Thus, in practice, such an embodiment provides a force response that requires less force to move the pedal P the first 50% or so of the way, but requires a bit more force to continue moving the pedal P from about the 50% location to the 100% location. The invention thus defines an inflection point at a pre-defined percentage or distance of the total travel path of a pedal P, whereby the springs S1 and S2 in combination achieve such non-linear effect.

In order to have a more realistic gaming experience, for an example, braking in a driving gaming application desirably should match the feel of an actual brake pedal. Thus, in accordance with the invention, the inflection point, or point of engagement of the second spring, matches with an increase braking in the actual game. To help make this seamless to the users, existing computing devices and gaming consoles, and existing gaming software, in accordance with the invention, firmware (not shown) may be included in peripheral device PD in order to perform the inverse mapping function of the non-linear force response curve represented by a dual spring embodiment of the invention to the linear force response curve represented by a single spring embodiment, so that the existing APIs employed by peripheral devices, computing devices and gaming applications that assume a single spring response curve can still be utilized.

Figure 4B:
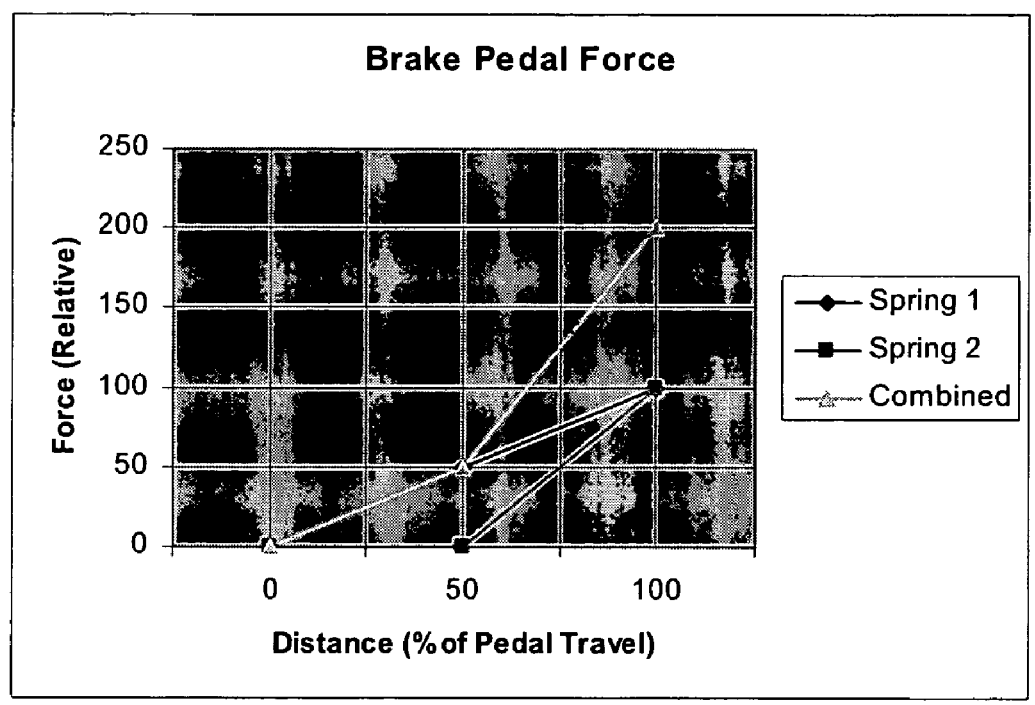
FIGS. 4B and 4C illustrate a comparison of graphical representations of the linear curves of single springs independently and the non-linear curves of multiple spring embodiments provided in accordance with the invention.

FIG. 4B illustrates these concepts in the non-limiting context where 50% of the total travel by pedal P is selected as the inflection point. As shown, spring 1 has a first linear response in accordance with a first spring constant as indicated by the segment marked with diamonds, and spring 2 has a second and independent linear response in accordance with a second spring constant, different from the first spring constant, as indicated by the segment marked with squares. When mechanically coupled to have combinatorial influence on the force response of pedal P in accordance with the presently described embodiments of the invention, the combined curve as indicated by the triangle results. The combinatorial influence of the second spring 2 with spring 1 achieves the non-linear resulting curve in accordance with the invention, thus providing a more realistic user experience with respect to pedal use for a peripheral device including pedal(s).

Figure 4C:
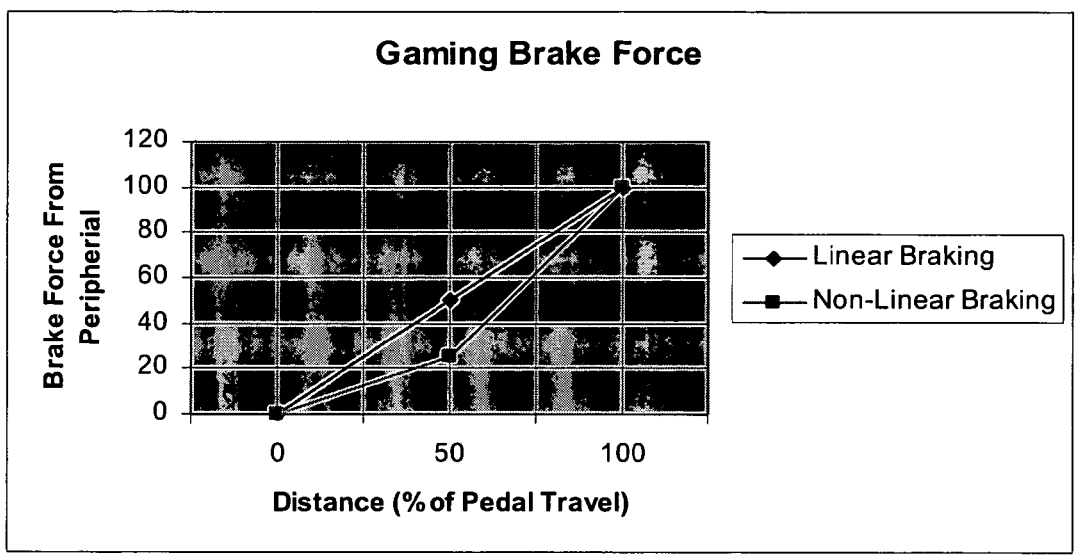

FIG. 4C illustrates a comparison of the non-linear curve as shown by the squares achievable in accordance with the dual spring embodiment of the invention to the pre-existing state of the art of a single spring having a linear response characteristic curve as shown by the diamonds. The inverse mapping between the curves implemented by software, firmware or hardware of the invention allows existing infrastructure, e.g., gaming APIs (console and application) and peripheral APIs, to be used despite the change in response characteristic.

Also, the non-linear curves shown in FIGS. 4B and 4C are illustrated in exemplary fashion as 2 linear segments; however, as can be appreciated, more complex curves can be achieved as well, e.g., the line segments can be 2 curves, or 1 line segment and 1 curve, depending on the mechanical components selected to achieve the response.

As mentioned, typically, firmware in a traditional system would return a linear representation of brake pedal displacement across the whole pedal motion. In the designs of the present invention, braking displacement is divided into two differently scaled areas. The first area is where only a single spring is engaged. In this portion of the travel of the pedal P, firmware scales the brake pedal travel to emphasize more brake displacement with less braking. In the second area where both springs are engaged, firmware scales brake travel to emphasize more braking with less brake displacement.

Thus, the invention enables the feel of a gas pedal, clutch, brake pedal in a car, or for another pedal, to maintain sense of realism in game play or application use due to a non-linear haptic feel afforded movement of the pedal. Thus, as described, a brake pedal can be implemented which goes from a light breaking to hard breaking as the pedal is engaged further in a nonlinear fashion. Accordingly, the invention achieves non-linear and/or multiple effects for a pedal assembly, i.e., changes in force requirements to move a pedal, with respect to the motion of one or more pedals of the pedal assembly that implement the dual spring non-linear force response mechanism of the invention.

Figure 4D:
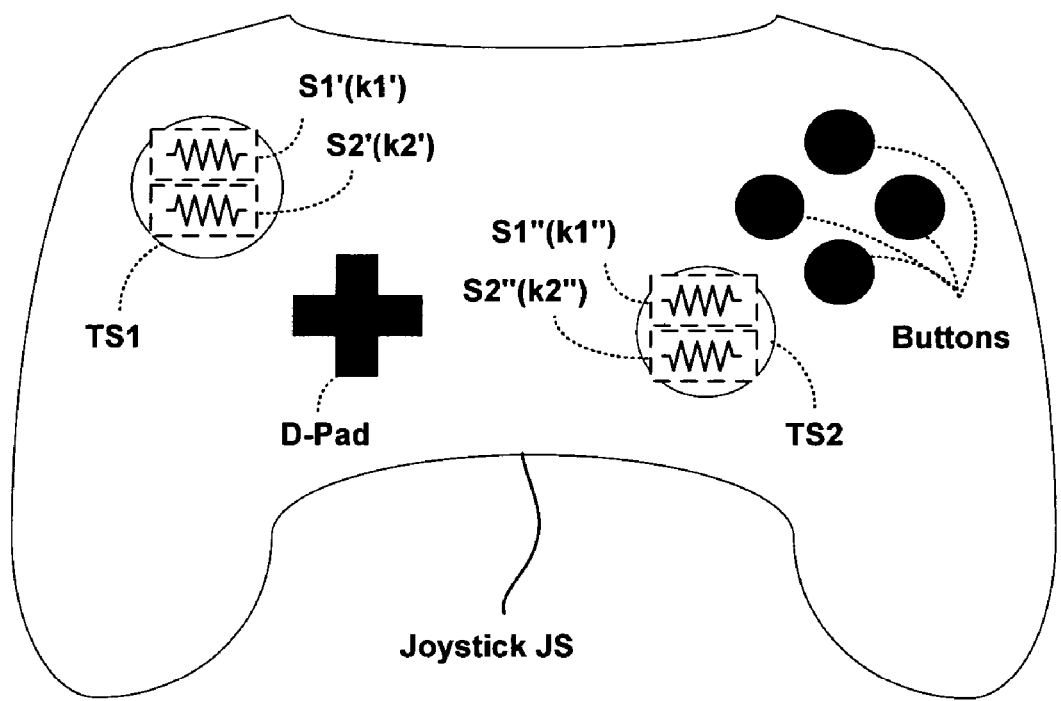
Figure 4E:
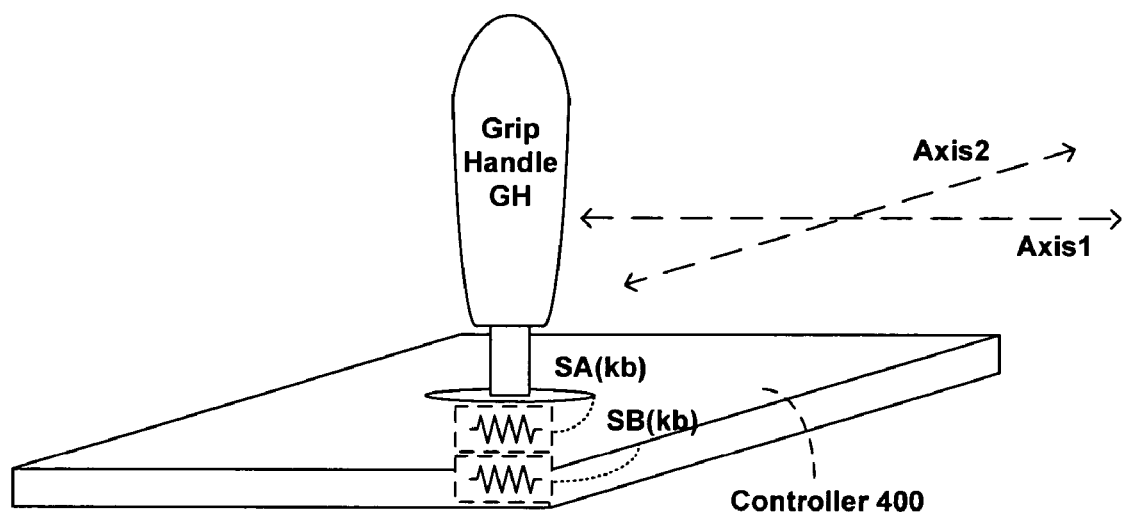

FIGS. 4D and 4E illustrate that the concepts pertaining to the inflection point for pedal motion can be ported to other peripheral device movements as well. For instance, as shown in FIG. 4D, one or more thumbsticks TS1 or TS2 of a joystick JS may include underlying spring actuation mechanisms S1' and S2', and S1" and S2", respectively, for any particular axis of motion for thumbsticks TS1 or TS2. If the same techniques are implemented again (two more springs) for a second axis of motion (e.g., orthogonal to the first axis), the non-linear force response achieved with the invention may be realized in two-dimensional thumbstick space as the user leans (applies force) on the thumbstick left, right, up, down, diagonally, etc. As shown, joystick JS may optionally include a D-pad, buttons, etc.

Similarly, FIG. 4E illustrates the concept for a controller 400 that may be utilized for as a peripheral device. Controller 400 includes a grip handle that may be utilized, for instance, for a flight simulation application whereby grip handle GH may be moved in different embodiments along axis2 only, axis1 only, or any combination of axis1 and axis2 movement. Thus, in accordance with non-limiting dual spring embodiments of the invention, controller 400, similar to the thumbsticks of joystick JS, may include springs SA and SB to achieve the non-linear force response of moving the grip handle GH of controller 400 along axis1 and/or axis2.

It should also be understood that the ideas pertaining to a two spring embodiment of the invention can be extended to a three spring embodiment with 2 inflection points on the curve, or to a four spring embodiment with 3 inflection points on the curve, and so on. By selectively and independently choosing when to engage each spring of a multiple spring embodiment, greater granularity of selection results in force response to apply to a wider variety of gaming and other computing applications for a peripheral device having at least one pedal.

Still further, in another aspect of a pedal assembly in order to provide realistic braking feel, a single stage spring design can be incorporated in accordance with embodiments of a peripheral device of the invention. Where a single spring is employed to achieve the non-linear effects of the invention, the single spring is characterized by a non-linear variable spring pressure as the spring is compressed, which is mechanically coupled between a pedal and one or more areas of a peripheral device to provide a non-linear response to force applied to the pedal, and a corresponding non-linear response as the pedal is released.

Figure 5:
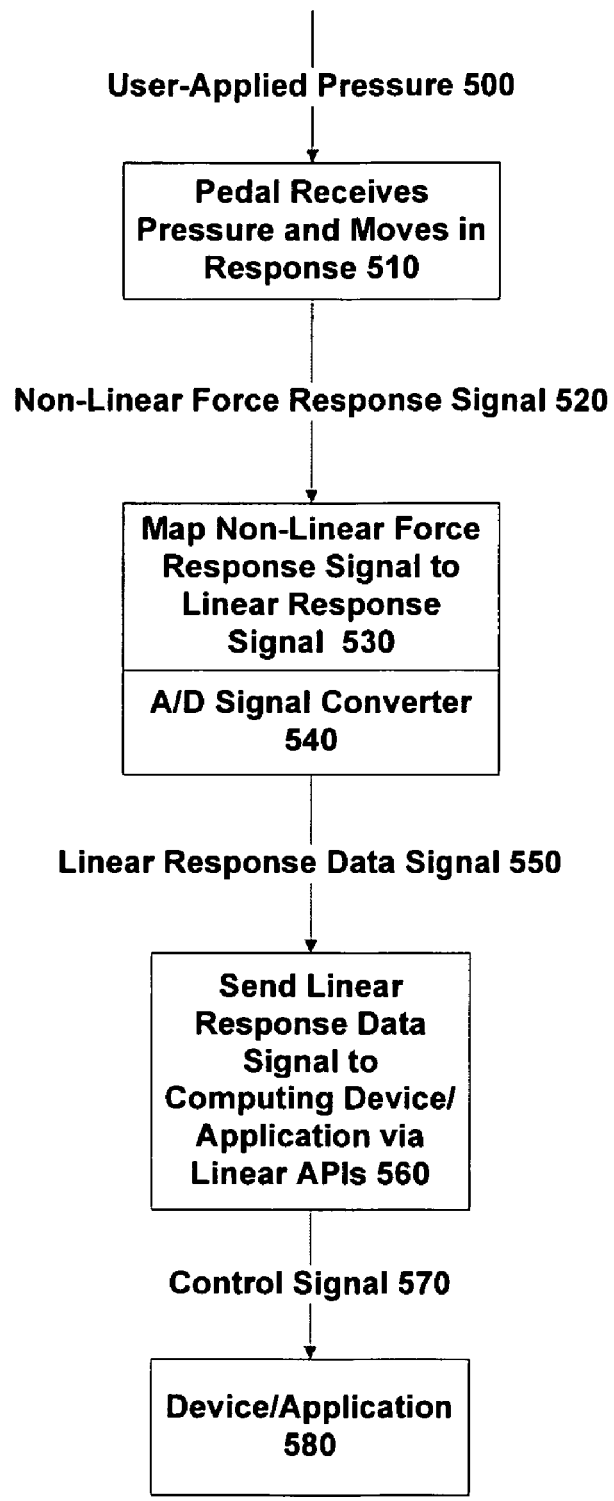
FIG. 5 is an exemplary non-limiting flow diagram showing a translation process from a non-linear force response to a linear force response to utilize existing infrastructure for handling linear force response.

FIG. 5 illustrates an exemplary mapping process achieved by software or firmware in accordance with the invention whereby the non-linear force response curve achieved by a multiple spring embodiment of the invention for a motion of a peripheral device, such as a pedal motion for a pedal of a pedal assembly, is mapped to a linear force response curve understood by existing API communications between the peripheral device and computing device/application. In another embodiment, APIs are improved to communicate the non-linear force signal information received from the multi-spring mechanisms so that the computing device and/or application can make use of the non-linear force signals with greater flexibility, i.e., any mapping of the non-linear force signal to another signal may be achieved with the invention, not just an inverse mapping to a linear force signal understood by existing systems.

At 500, a user of the peripheral device having a multiple spring embodiment of the invention applies pressure to the applicable component of the peripheral device, e.g., pedal of a pedal assembly. At 510, the applicable component of the peripheral device receives the pressure from the user and moves a pre-determined distance according to the non-linear force response curve defined by the applicable multiple spring embodiment of the invention, in response to the pressure exerted by the user. At 520, a non-linear force response signal associated with the movement of the applicable component due to the exertion of the pressure by the user is recorded in response to such movement by the applicable signal electronics (software and/or hardware) communicatively coupled to the multiple spring embodiment. At 530, the non-linear force response signal recorded at 520 is mapped to a linear response signal. At 540, though such step may be performed at any time during signal processing, the linear response signal, if represented by one or more analog signals, is converted to a digital representation. A linear response data signal is the result at 550 representing linear motion to the device/application, thereby seamlessly representing the non-linear force response function of 520 via existing peripheral APIs and device/application APIs for communicating linear motion information. At 560, the linear response data signal is thus packaged according to existing linear APIs at 560 to communicate a control signal at 570 to the device/application, which is received and acted upon by the device and/or application utilizing the peripheral device input at 580.

The invention thus provides an integrated method of and structures for preventing a pedal assembly from sliding or slipping during use on all types of flooring surfaces. The methods and structures allow the user to use the heels of their feet to pull the pedal assembly back towards them if it does slip forward, without having to stop gaming and reach down with their hands to pull it forward. The invention also provides more realistic user experience for a pedal of a pedal assembly by implementing multiple springs in connection with the force response of the pedal to provide a non-linear experience that better maps to actual pedal use (e.g., for a brake pedal of a car).

With the ever expanding universe of devices, any of the above-described peripheral devices can be utilized in connection with applications, such as gaming applications, of a variety of computing devices. Such computing devices in accordance with the invention include (a) portable media players, such as MP3 players, walkmans, etc., (b) portable computing devices, such as laptops, personal digital assistants ("PDAs"), cell phones, portable email devices, thin clients, portable gaming devices (e.g., portable Playstation, Gameboy), etc., (c) standalone computing devices, such as personal computers ("PCs"), server computers, gaming platforms (e.g., Xbox) mainframes, etc., (d) consumer electronic devices, such as TVs, DVD players, set top boxes, monitors, displays, etc., (e) public computing devices, such as kiosks, in-store music sampling devices, automated teller machines (ATMs), arcade machines, cash registers, etc. and (f) non-conventional computing devices, such as kitchen appliances, motor vehicle controls (e.g., steering wheels), etc.

In this regard, a peripheral device of the invention may provide input and/or receive output from any of such computing devices where the peripheral device can generally be attached to augment input and/or output characteristics of the computing device. Two exemplary, non-limiting computing devices to which a peripheral device having pedal(s) of the invention may be communicatively coupled are described in exemplary fashion as follows.

Exemplary Computing Device

Figure 6A:
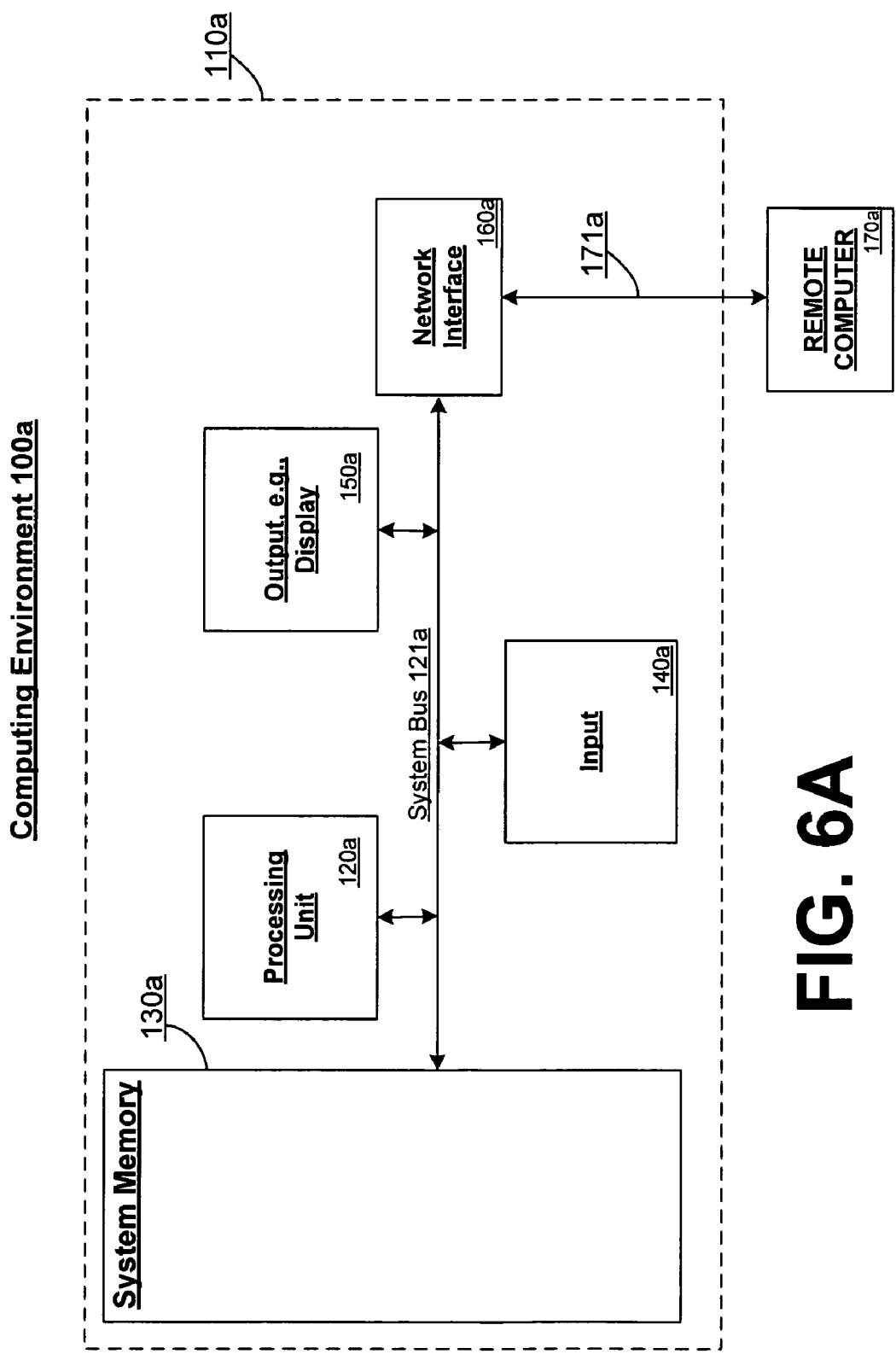
FIG. 6A is a block diagram representing an exemplary non-limiting computing system environment to which a peripheral device in accordance with the invention may be connected.

As mentioned, the invention applies to any device wherein it may be desirable to include an input device for receiving input from a human being via at least one pedal. It should be understood, however, as indicated above, that handheld, portable and other computing devices and computing objects of all kinds are contemplated for use in connection with an input device of the present invention. Accordingly, the below general purpose remote computer described below in FIG. 6A is but one example, and the present invention may be implemented with any client or portable device, whether standalone or having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance.

Although not required, the invention can partly be implemented via an operating system, for use by a developer of services for a device or object, and/or included within application software that operates in connection with the peripheral device(s) of the invention. Software may be described in the general context of computer-executable instructions, such as program modules, being executed by one or more computers, such as client workstations, servers or other devices. Those skilled in the art will appreciate that the invention may be practiced with other computer system configurations and protocols.

FIG. 6A thus illustrates an example of a suitable computing system environment 100a in which the invention may be implemented, although as made clear above, the computing system environment 100a is only one example of a suitable computing environment for an input device and is not intended to suggest any limitation as to the scope of use or functionality of the invention. Neither should the computing environment 100a be interpreted as having any dependency or requirement relating to any one or combination of components illustrated in the exemplary operating environment 100a.

With reference to FIG. 6A, an exemplary remote device for implementing the invention includes a general purpose computing device in the form of a computer 110a. Components of computer 110a may include, but are not limited to, a processing unit 120a, a system memory 130a, and a system bus 121a that couples various system components including the system memory to the processing unit 120a. The system bus 121a may be any of several types of bus structures including a memory bus or memory controller, a peripheral bus, and a local bus using any of a variety of bus architectures.

Computer 110a typically includes a variety of computer readable media. Computer readable media can be any available media that can be accessed by computer 110a. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110a. Communication media typically embodies computer readable instructions, data structures, program modules or other data in a modulated data signal such as a carrier wave or other transport mechanism and includes any information delivery media.

The system memory 130a may include computer storage media in the form of volatile and/or nonvolatile memory such as read only memory (ROM) and/or random access memory (RAM). A basic input/output system (BIOS), containing the basic routines that help to transfer information between elements within computer 110a, such as during start-up, may be stored in memory 130a. Memory 130a typically also contains data and/or program modules that are immediately accessible to and/or presently being operated on by processing unit 120a. By way of example, and not limitation, memory 130a may also include an operating system, application programs, other program modules, and program data.

The computer 110a may also include other removable/non-removable, volatile/nonvolatile computer storage media. For example, computer 110a could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 121a through a non-removable memory interface such as an interface, and a magnetic disk drive or optical disk drive is typically connected to the system bus 121a by a removable memory interface, such as an interface.

In addition to a peripheral device according to the invention, a user may enter commands and information into the computer 110a through input devices such as a keyboard and pointing device, commonly referred to as a mouse, trackball or touch pad. In addition to a peripheral device in accordance with the invention, other input devices may include a microphone, joystick, game pad, satellite dish, scanner, or the like. These and other input devices are often connected to the processing unit 120a through user input 140a and associated interface(s) that are coupled to the system bus 121a, but may be connected by other interface and bus structures, such as a parallel port, game port or a universal serial bus (USB). A graphics subsystem may also be connected to the system bus 121a. A monitor or other type of display device is also connected to the system bus 121a via an interface, such as output interface 150a, which may in turn communicate with video memory. In addition to a monitor, computers may also include other peripheral output devices such as speakers and a printer, which may be connected through output interface 150a.

The computer 110a may operate in a networked or distributed environment using logical connections to one or more other remote computers, such as remote computer 170a, which may in turn have media capabilities different from device 110a. The remote computer 170a may be a personal computer, a server, a router, a network PC, a peer device or other common network node, or any other remote media consumption or transmission device, and may include any or all of the elements described above relative to the computer 110a. The logical connections depicted in FIG. 6A include a network 171a, such local area network (LAN) or a wide area network (WAN), but may also include other networks/buses. Such networking environments are commonplace in homes, offices, enterprise-wide computer networks, intranets and the Internet.

When used in a LAN networking environment, the computer 110a is connected to the LAN 171a through a network interface or adapter. When used in a WAN networking environment, the computer 110a typically includes a modem or other means for establishing communications over the WAN, such as the Internet. A modem, which may be internal or external, may be connected to the system bus 121a via the user input interface of input 140a, or other appropriate mechanism. In a networked environment, program modules depicted relative to the computer 110a, or portions thereof, may be stored in a remote memory storage device. It will be appreciated that the network connections shown and described are exemplary and other means of establishing a communications link between the computers may be used.

Exemplary Multimedia Console Environment

Figure 6B:
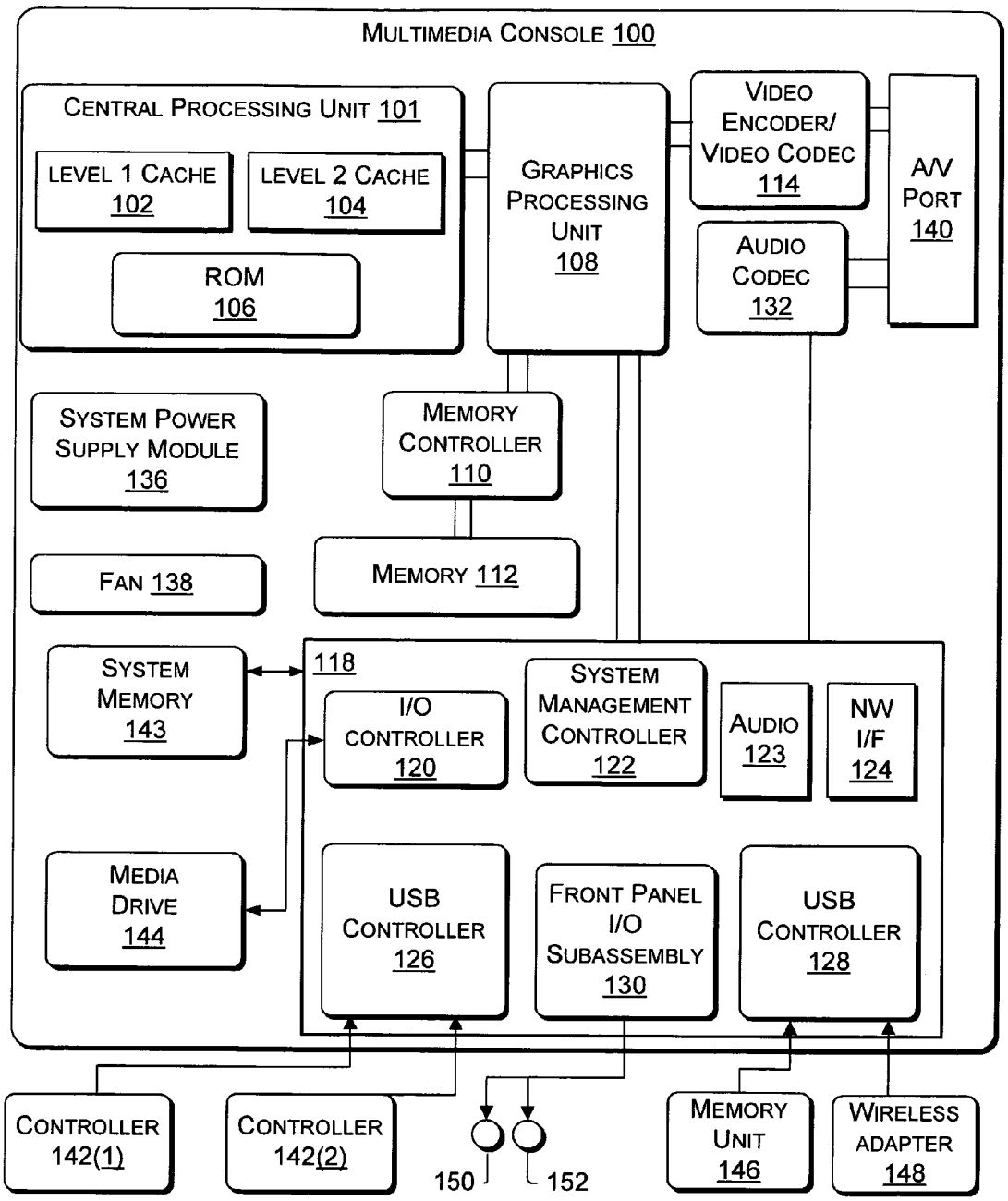
FIG. 6B is a block diagram showing an exemplary non-limiting multimedia console to which a peripheral device in accordance with the invention may be connected.

Referring next to FIG. 6B, shown is a block diagram illustrating another exemplary non-limiting computing device, i.e., an exemplary multimedia console, to which a peripheral device having pedal(s) of the invention may be connected via wired or wireless means. FIG. 6B shows the functional components of a multimedia console 100 in which aspects of the invention may be implemented. The multimedia console 100 has a central processing unit (CPU) 101 having a level 1 (L1) cache 102, a level 2 (L2) cache 104, and a flash ROM (Read-only Memory) 106. The level 1 cache 102 and level 2 cache 104 temporarily store data and hence reduce the number of memory access cycles, thereby improving processing speed and throughput. The flash ROM 106 may store executable code that is loaded during an initial phase of a boot process when the multimedia console 100 is powered. Alternatively, the executable code that is loaded during the initial boot phase may be stored in a FLASH memory device (not shown). Further, ROM 106 may be located separate from CPU 101.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 and CPU 101 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory unit 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless interface components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 126 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures.

When the multimedia console 100 is powered on or rebooted, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 may allow one or more users to interact with the system, watch movies, listen to music, and the like. However, with the integration of broadband connectivity made available through the network interface 124 or the wireless adapter 148, the multimedia console 100 may further be operated as a participant in a larger network community.

The multimedia console depicted in FIG. 6B is a typical multimedia console that may be used to execute a multimedia application, such as, for example, a game. Multimedia applications may be enhanced with system features including for example, system settings, voice chat, networked gaming, the capability of interacting with other users over a network, e-mail, a browser application, etc. Such system features enable improved functionality for multimedia console 100, such as, for example, players in different locations can play a common game via the Internet.

Also, over time, system features may be updated or added to a multimedia application. Rather than requiring the multimedia developer to make significant modifications to the multimedia application to provide these system features, the systems and methods described herein allow a multimedia developer to provide system features through separate system applications that work in conjunction with the multimedia application. For example, a system application may embody functionality related to networked capabilities, thereby enabling a multimedia application to be readily adapted to provide networked capabilities with little work by the multimedia (e.g., game) developer. One such capability is that of system level notifications for multiple and networked users. Making system level notifications part of a system application as opposed to being handled by individual multimedia applications, such as games running on the system, takes handling displaying notifications such as game invitations out of the development process for multimedia application developers and allows them to focus on the multimedia application itself.

For the avoidance of doubt, use of the invention is contemplated from the standpoint of an API (or other software object), either on a host device being controlled by an input device of the invention where the input device operates as a remote control, or on the input device itself. Thus, various implementations of the invention described herein may have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system in which an input device may be utilized to control the device or system. For instance, the algorithm(s) and hardware implementations of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. FIG. 5 illustrates one way of implementing an algorithmic flow for handling non-linear force signals in accordance with the invention; however, one of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize any software provided in accordance with the invention are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, one skilled in the art will recognize that the methods, as described in the present application may apply to any computing device or environment, such as a gaming console, handheld computer, portable computer, etc., whether wired or wireless, and may be applied to any number of such computing devices connected via a communications network, and interacting across the network.

Furthermore, it should be emphasized that a variety of computer platforms, including handheld device operating systems and other application specific operating systems are contemplated, especially as the number of wireless networked devices continues to proliferate. Still further, functionality of the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed:

1. A peripheral device for providing input to a computing device, comprising:
    a base; and
    at least one pedal mechanically coupled to the base;
    the base comprising at least one heel engaging portion adapted to engage a user's heel at an area located substantially where a user's heel of a user's foot is positioned when operating the at least one pedal, the heel engaging portion comprising a frame that defines at least one recess formed in the base, the recess adapted to receive the user's heel and allow the user's heel to contact a surface below the base,
    wherein the frame is adapted to receive a counterforce to a slipping force at the heel engaging portion from the user's heel received in the recess and in contact with the surface below the base, and
    wherein the slipping force is a force that causes the peripheral device to slip with respect to a floor surface on which the peripheral device rests.

2. A peripheral device according to claim 1, wherein the slipping force results from a horizontal component of the force applied to the at least one pedal by the user.

3. A peripheral device according to claim 1, further comprising:
    at least one of the following adapted to fasten the user's foot to the peripheral device:
    a strap, a clip, a clasp, a button, or a snap.

4. A peripheral device according to claim 1, wherein the heel contact portion enables the user to directly apply said counterforce to the slipping force with the user's heel, wherein the counterforce includes a horizontal component equal to or greater than the slipping force.

5. A peripheral device according to claim 1,
    wherein the heel engaging mechanism is adapted to form a physical coupling with a part of the user's foot, wherein the heel engaging mechanism operates to guide the counterforce applied by the user's foot when used to counter the slipping force.

6. A method for applying a counterforce to a slipping force in connection with the use of a peripheral device including at least one pedal, comprising:
    removably fastening a user's foot to a peripheral device, the heel of the user's foot being positioned in a recess formed in the peripheral device, the recess formed at a position relative to at least one pedal of the peripheral device so as to allow the user's heel to contact a surface below the peripheral device when the user is operating the peripheral device;
    receiving a first force by the at least one pedal of the peripheral device from the foot of the user, wherein the first force includes a first horizontal force component that causes a bottom surface of the peripheral device to slip forward relative to a floor surface upon which said bottom surface rests; and
    receiving a second force by the peripheral device from the user's heel that counters the horizontal component that causes the bottom surface to slip relative to the floor surface, the second force being received at the recess formed in the peripheral device, the second force resulting from friction between the user's heel and a surface below the peripheral device.

7. The method of claim 6, wherein the second force includes a second horizontal force component that is equal to or greater than the first horizontal force component.

8. The method of claim 6, wherein removably fastening a user's foot to the peripheral device comprises removably fastening at least one of: a strap, clip, clasp, button, or snap.

9. The method of claim 7, wherein said receiving a second force includes receiving the second force directly from a user's heel as initiated by movement of the foot of the user.

10. The method of claim 7, wherein said receiving a second force includes receiving the second force indirectly from a user's heel due to the user's heel being anchored to the floor through at least one hole defined by the frame.

* * * * *